United States Patent

Tonsfeldt

[15] 3,680,648
[45] Aug. 1, 1972

[54] ROW CROP CULTIVATOR

[72] Inventor: Wayne S. Tonsfeldt, Sabin, Minn.

[73] Assignee: Alloway Manufacturing, Inc., Fargo, N. Dak.

[22] Filed: Jan. 22, 1970

[21] Appl. No.: 5,056

[52] U.S. Cl. ............172/159, 172/201, 172/311, 172/417, 172/456, 172/484, 172/508, 172/671, 172/744
[51] Int. Cl. .................A01b 17/00, A01b 63/24
[58] Field of Search..............172/192–196, 286–287, 172/388, 417, 397, 311, 507–513, 671, 675, 676, 619, 642, 654, 446, 447, 451, 456, 739, 734, 744, 155, 201; 280/411, 413, 412; 306/1.5; 287/54 B, 54.1

[56] References Cited

UNITED STATES PATENTS

| | | | |
|---|---|---|---|
| 2,562,486 | 7/1951 | Denning | 172/446 |
| 2,697,975 | 12/1954 | Buhr | 172/739 |
| 2,646,738 | 7/1953 | Denning | 172/739 |
| 2,649,722 | 8/1953 | Raught | 172/451 |
| 296,332 | 4/1884 | Hartmann | 287/54 |
| 85,968 | 1/1869 | Shank | 172/513 |
| 2,804,815 | 9/1957 | Dollen | 172/511 |
| 2,805,614 | 9/1957 | Lipetzky | 172/511 |
| 2,669,174 | 2/1954 | Oehler | 287/54 B |
| R25,803 | 6/1965 | Lynch | 172/192 |
| 3,208,535 | 9/1965 | Fischer | 172/6 |
| 3,490,542 | 1/1970 | Eiten | 172/739 |
| 3,529,674 | 9/1970 | Todd et al. | 172/676 |
| 3,539,019 | 11/1970 | Mattson et al. | 172/512 |
| 470,390 | 4/1892 | Bostick | 306/1.5 |
| 3,550,969 | 12/1970 | Robinson | 306/1.5 |

FOREIGN PATENTS OR APPLICATIONS

| | | | |
|---|---|---|---|
| 445,174 | 6/1962 | Germany | 172/509 |
| 289,322 | 3/1965 | Netherlands | 172/744 |

*Primary Examiner*—Robert E. Pulfrey
*Assistant Examiner*—C. W. Hanor
*Attorney*—Burd, Braddock & Bartz

[57] ABSTRACT

A row crop cultivator mounted on a three-point hitch of an agricultural tractor. The cultivator has a folding frame with a center beam assembly and side beams pivotally mounted on arms pivotally attached to the center beam. The arms selectively permit opposite ends of the side beams to be coupled to the center beam assembly so that the cultivator can be assembled in a wide, transverse working position and, alternatively, in a folded, narrow, transport position. The cultivator has transverse tool bars carrying a plurality of earth working dual discs. Mounted on the tool bars are pairs of row guide units having wheels that function to align the cultivator with furrows midway between the rows of crops. Each row guide unit has a furrowing tool associated with a shield to form a furrow midway between the rows of crops.

23 Claims, 9 Drawing Figures

PATENTED AUG 1 1972

INVENTOR
WAYNE S. TONSFELDT
BY
Burd, Braddock & Bartz
ATTORNEYS

INVENTOR.
WAYNE S. TONSFELDT
BY
Burd, Braddock & Bartz
ATTORNEYS

INVENTOR.
WAYNE S. TONSFELDT
BY
Burd, Braddock & Barty
ATTORNEYS

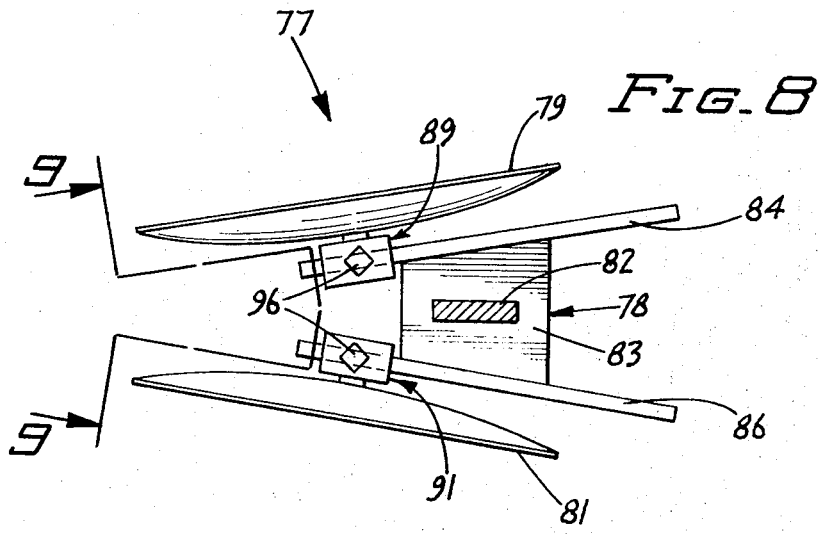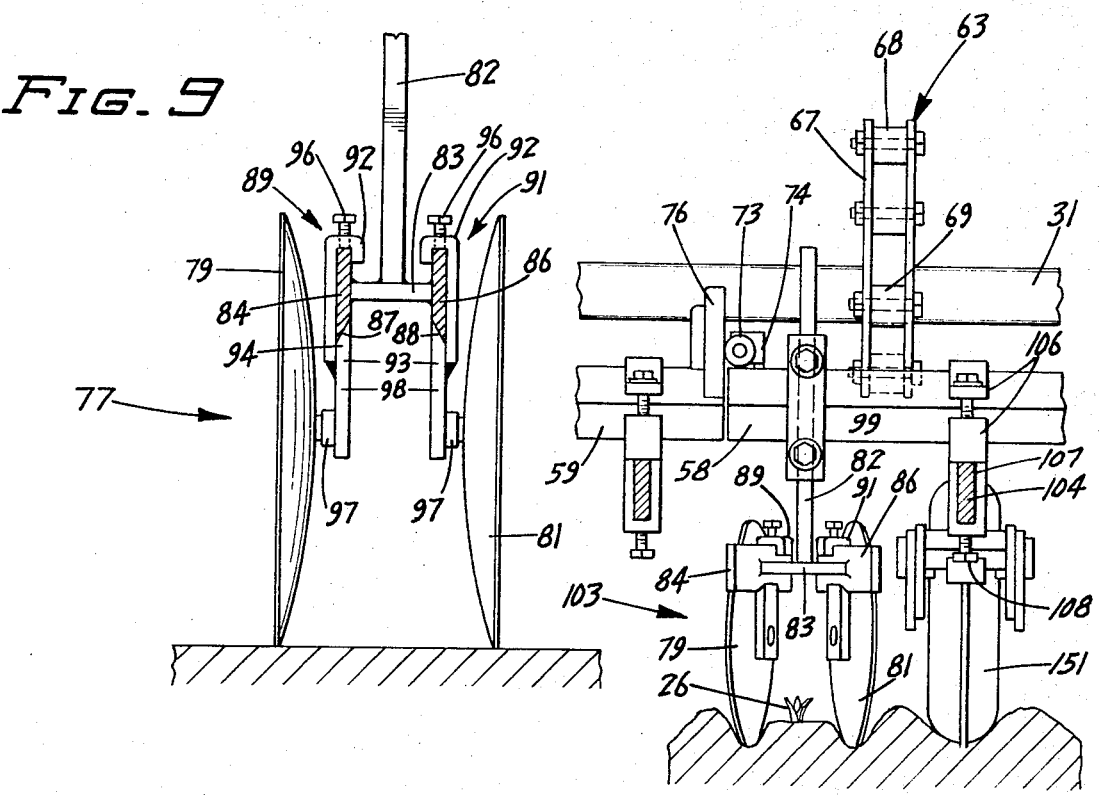

ROW CROP CULTIVATOR

BACKGROUND OF THE INVENTION

The three-point hitch on an agricultural tractor is used to connect a rear mounted row crop cultivator to the tractor. The conventional rear mounted cultivator has a long, transverse tool bar. Gangs of spaced earth working tools are connected to the tool bar with parallel linkages. Gauge wheels are used with the gangs to control the working depth of the earth working shovels and sweeps. An example of this type of rear mounted row crop cultivator is shown in U.S. Pat. No. 3,208,535. These cultivators have a limited width, as the transverse tool bar cannot be folded or otherwise decreased in length to reduce the overall width of the cultivator. These wide cultivators are difficult and dangerous to transport to the various fields to be cultivated. The prior art rear mounted row crop cultivators require considerable attention and work on the part of the operator to maintain the earth working tools in proper relation to the rows of crops to avoid any damage to the crops. Electrically operated photoelectric cells have been used to sense the position of the crops to control the steering of the tractor. This type of structure is also shown in U.S. Pat. No. 3,208,535. The cultivator itself does not have any structure which automatically maintains the alignment of the earth working tools relative to the rows of crops.

SUMMARY OF THE INVENTION

The invention relates to a row crop cultivator mounted on a tractor for cultivating a plurality of rows of crops, as beets, beans, corn and the like. The cultivator has a main frame assembly mountable on the tractor. Located rearwardly of the main frame is a transverse tool bar means connected to the main frame with linkage means which permit the tool bar means to have limited independent up and down movement. A plurality of spaced earth working tools are mounted on the tool bar means for working the soil adjacent the rows of the crops. Row guide assembly means are also mounted on the tool bar means for controlling the lateral position of the tool bar means to maintain the earth working tools in proper relationship relative to the rows of crops. The row guide means have forward wheels adapted to follow furrows between the rows of crops and a rear furrowing tool means to make a furrow longitudinally aligned with the wheels. These furrows are used in the subsequent cultivation to guide the cultivator. These furrows are also used to position and guide the tractor between the rows of crops.

Another feature of the invention is a main frame assembly which has side sections located adjacent opposite ends of a center section mountable on a tractor. The side sections are pivotally mounted on arm means which permit the opposite ends of the side sections to be selectively attached to the side sections in a first outwardly directed wide working position and a second rearwardly directed, folded, narrow, transport position. A holding means is used to releasably connect the opposite ends of the side sections to the center section.

A further feature of the invention is the utilization of a row guide unit which has a longitudinal member mounted on the tool bar means. A guide wheel is mounted on the forward portion of the member opposite the furrowing tool means. The furrowing tool means has an upright standard adjustably mounted on the longitudinal member. An adjustable connection, having a block with an upright convex face and flat edge opposite the face, is used to adjust both the vertical position of the standard, as well as the angular position of the standard and thereby change the earth working characteristics of the tool on the standard and the action of the guide wheel.

IN THE DRAWINGS

FIG. 7 is an elevational view taken along line 7—7 of FIG. 6;

FIG. 8 is a plan view of the dual disc earth working tool; and

FIG. 9 is a sectional view taken along the line 9—9 of FIG. 8.

Figure 1:
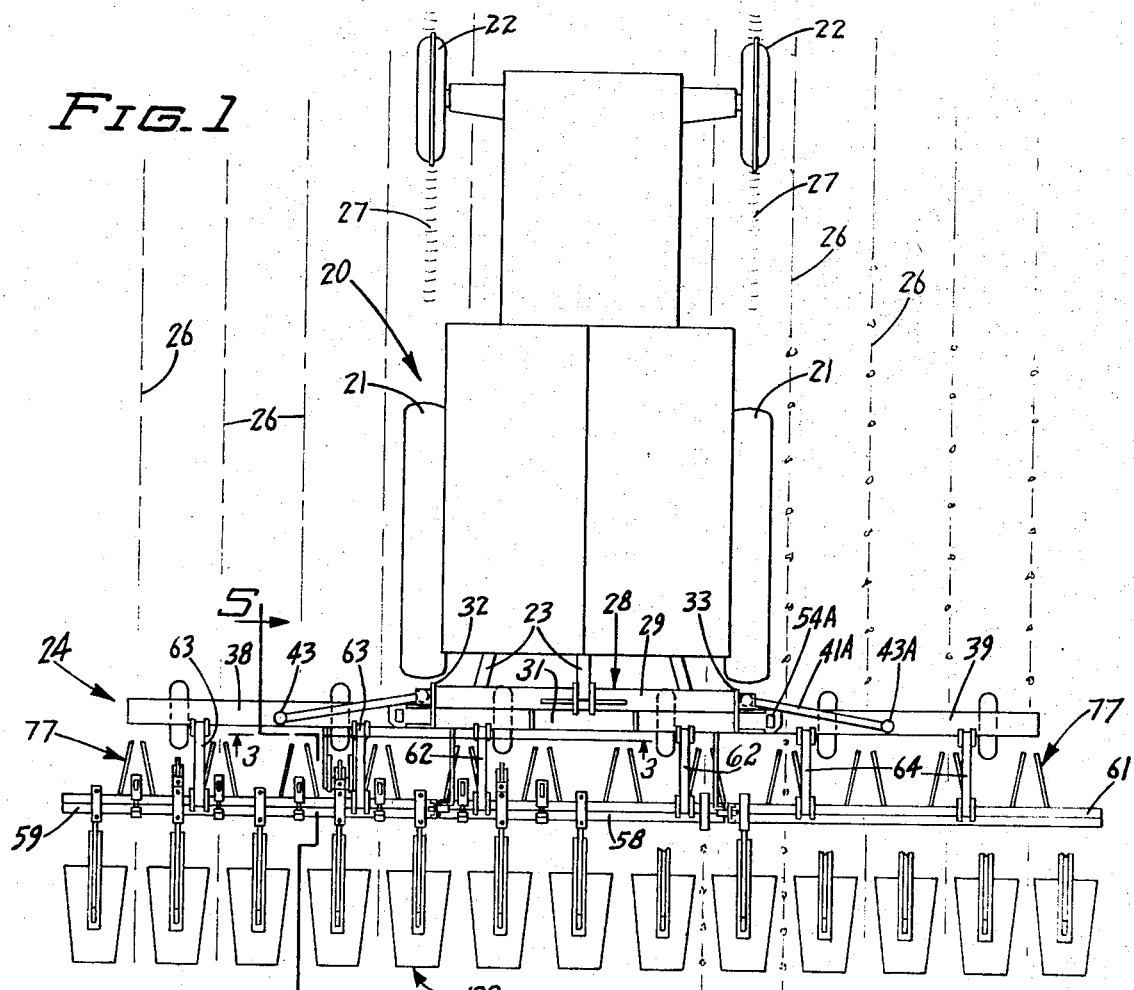
FIG. 1 is a plan view of an agricultural tractor equipped with the row crop cultivator of the invention.
Figure 2:
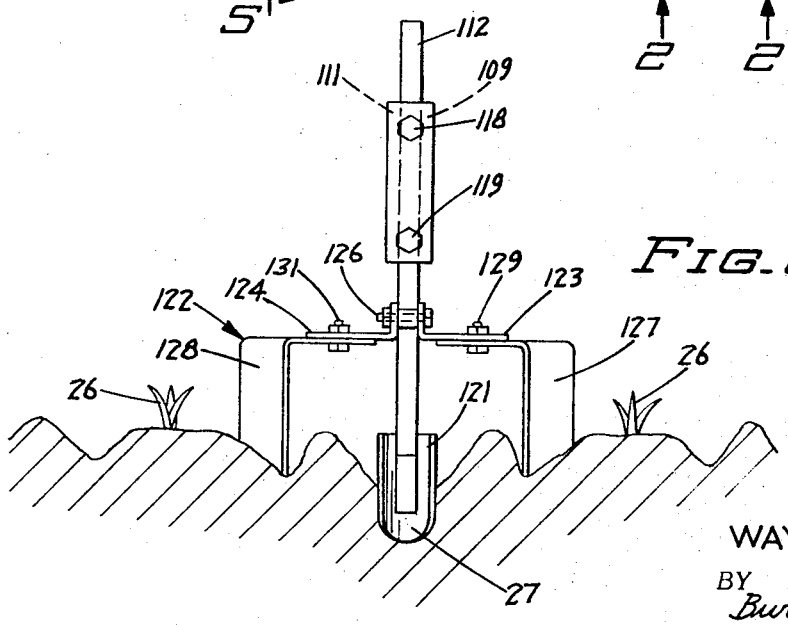
FIG. 2 is an enlarged elevational view taken along line 2—2 of FIG. 1.

Referring to the drawings, there is shown in FIG. 1 an agricultural tractor, indicated generally at 20, having a pair of large rear drive wheels 21 and front steering wheels 22. Tractor 20 has a conventional three-point hitch 23 attached to the row crop cultivator of the invention, indicated generally at 24. The tractor 20 and cultivator 24 are shown in a field having a plurality of rows of crops 26, as beets, beans, onions, corn and the like. The row crop cultivator 24 works the soil and makes furrows 27 down the middle of the cultivated spaces between the rows. These furrows function to guide the tractor, as well as the cultivator, in the subsequent cultivation. FIG. 2 is an elevational view illustrating the furrow 27 midway between the rows of crops 26.

Figure 3:
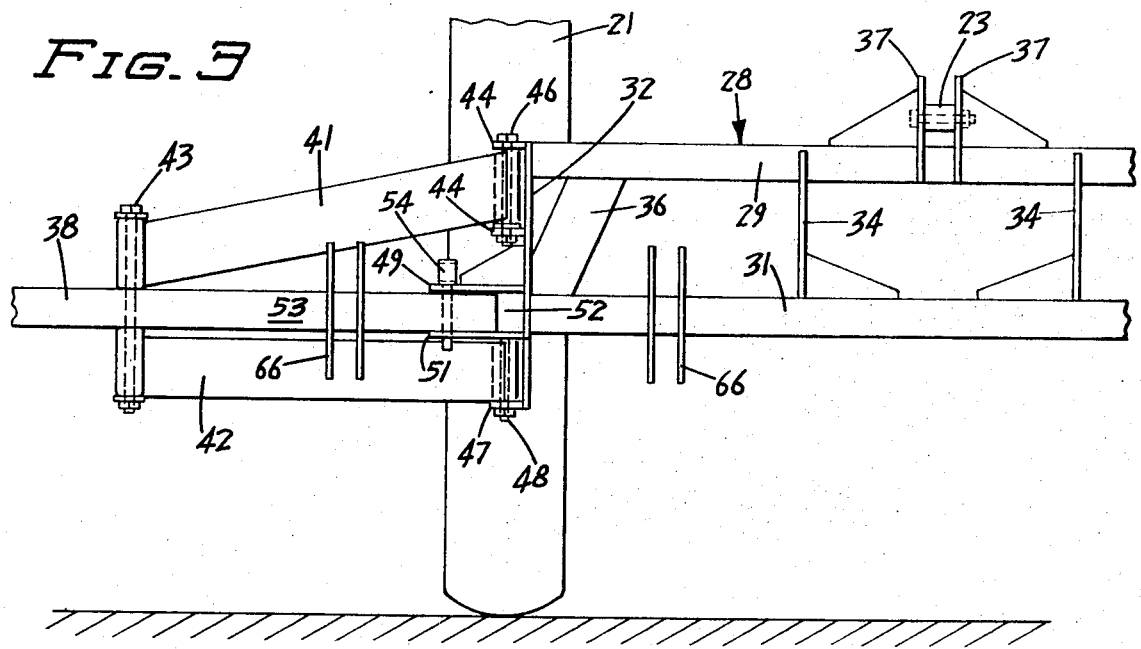
FIG. 3 is an elevational view taken along line 3—3 of FIG. 1 with parts deleted to show the main frame assembly.
Figure 4:
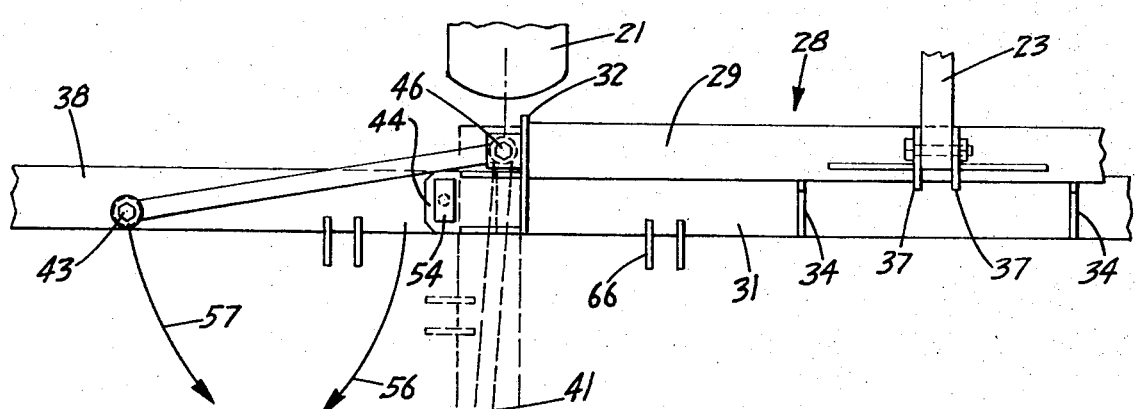
FIG. 4 is a top plan view of FIG. 3.

The cultivator 24 has a main frame assembly, indicated generally at 28, mounted directly on the three-point hitch 23. As shown in FIGS. 1, 3, and 4, main frame assembly 28 has a transverse top beam 29 positioned above and slightly forward of a transverse bottom beam 31. Upright end plates 32 and 33 are secured to the opposite ends of the beams 29 and 31. The beams are also connected with intermediate upright plates 34 and reinforcing members 36. Secured to the center portion of the top beam 29 are a pair of upright plates 37 for accommodating the control link of the three-point hitch 23. The draft links of the three-point hitch are attached to the lower beam 31 so that the main frame assembly is raised and lowered along with the movement of the three-point hitch.

Projected outwardly from opposite ends of the end plates 32 and 33 are side beams or sections 38 and 39, respectively. The side beams are mounted on their respective end plates in an identical manner. This mounting permits the side beams 38 and 39 to fold back to a transport position so that the width of the cultivator is reduced for movement to other locations. The structure mounting beam 39 to the end plate 33 is identical with the structure mounting the side beam 38 to the end plate 32 and is identified with the same reference numeral having the suffix A.

Referring to FIGS. 3 and 4, side beam 38 is pivotally attached to the end plate 32 with a pair of arms 41 and 42. An upright pivot 43 connects the outer ends of the arms 41 and 42 to a midsection of side beam 38. The inner end of arm 41 is located between a pair of outwardly directed ears 44. An upright pivot member 46 extends through the ears 44 and the arm 41 to pivotally mount the upper arm on the end plate 32. Similar outwardly directed ears 47 are secured to the lower end of the end plate 32 for accommodating the inner end of the lower arm 42. An upright pivot member 48 connects the arm 42 to the ears 47. The pivot members 46 and 48 are generally positioned along the same upright axis. Secured to the midsection of the end plate 32, rearwardly of the ears 44 and 47, are a pair of vertically spaced horizontal plates 49 and 51. The plates 49 and 51 project outwardly from the outside of end plate 32 to form a space 52 for accommodating the inner end 53 of the side beam 38. An end 53 is held in assembled relation with the plates 49 and 51 with a removable upright pin 54 which extends through suitable vertically aligned holes in the plates 49 and 51 and end 53. The pin 54, along with the arms 41 and 42, hold the side beam 38 in its extended outward working position in general alignment with the bottom transverse beam 31. The arms 41 and 42 also support the side beam 38 in an upright direction, whereby the beam 38 is partially balanced on the arms 41 and 42 to reduce the cantilever bending action on the plates 49 and 51 and pin 54.

The side beam 38 can be folded back to the transport position by initially removing the pin 54. The inner end 53 is swung outwardly, as indicated by arrow 56, about the pivot member 43. The side beam 38, along with the arms 41 and 42, is then swung inwardly in the direction of arrow 57 about the pivot members 46 and 48 until it is substantially normal to the center section of the frame assembly. The outer end of the beam 28 fits into the space 52 between the plates 49 and 51. The pin 54 is placed back in the holes in the outer portions of the plates 49 and 51 to hold the beam 38 in its rearwardly extended position. The opposite side beam 39 can be folded in a similar manner to the rearward transport position and thereby reduce the overall width of the cultivator.

Figure 5:
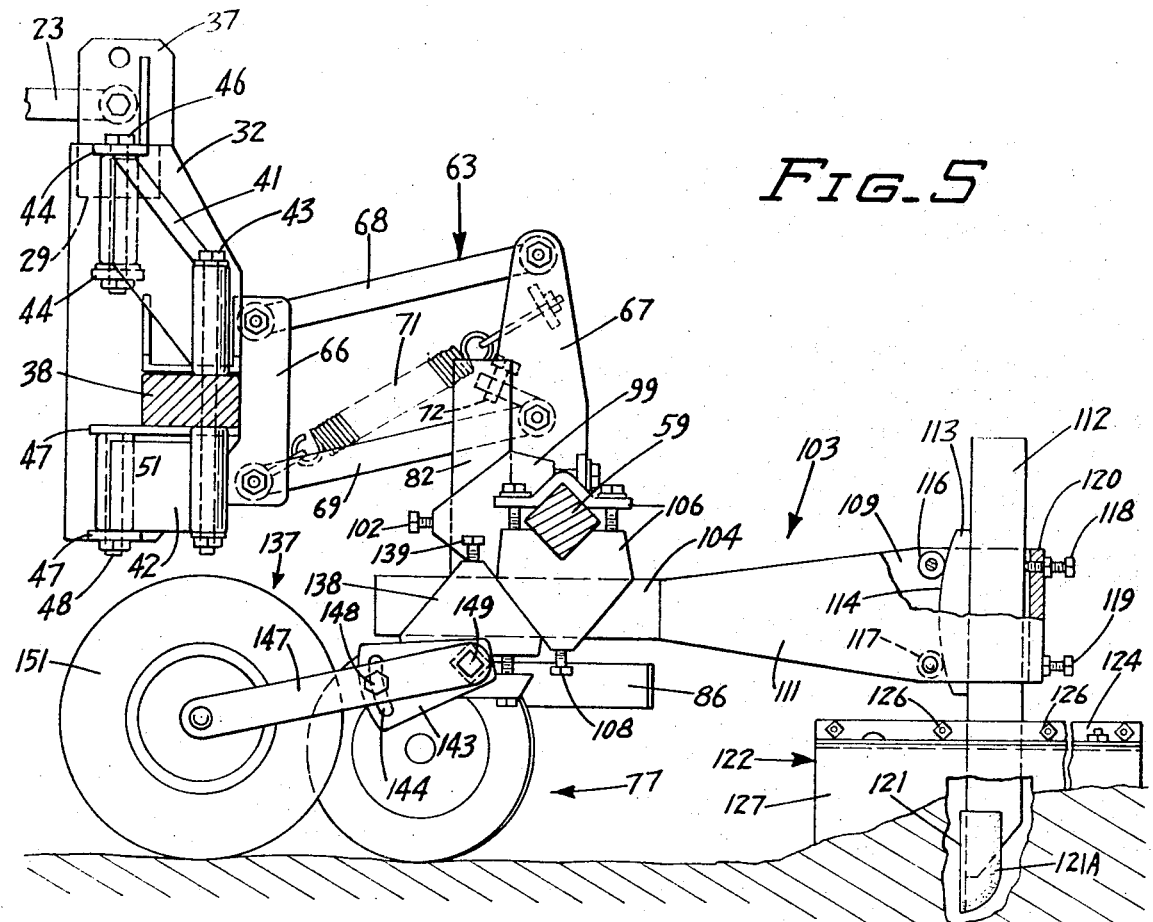
FIG. 5 is an enlarged sectional view taken along line 5—5 of FIG. 1.

Returning to FIG. 1, the cultivator 24 has a center transverse tool bar 58 and side tool bars 59 and 61 transversely aligned with tool bar 58. A first pair of parallel linkages 62 pivotally mount the tool bar 58 on the center beam 31 to provide the tool bar 58 with independent up and down movement. A second pair of parallel linkages 63 pivotally mount the side tool bar 59 to the side beam 38. In a similar manner, a third pair of parallel linkages 64 pivotally mount the side tool bar 61 to the side beam 39. The structure of the parallel linkages is shown in detail in FIG. 5. Each parallel linkage is pivotally mounted on a pair of upright members 66 mounted to the main frame assembly. The upright members 66, shown in FIG. 5, are mounted to the side beam 38. A pair of upright post members 67 are secured to the tool bar 59. A pair of parallel links 68 and 69 are pivotally connected to the upright member 66 and post member 67. A spring 71, connected to the bottom forward portion of the link 69 and the upper outer portion of the post member 67, biases the parallel linkage in a downward direction. Secured to the upright post member 67 is a plate carrying an adjustable stop 72 operative to limit the relative pivotal movement between the lower link 69 and the upright support member 67 so that, upon raising of the main frame assembly 28 with the three-point hitch, all the transverse tool bars 58, 59, and 61 will be moved in an upward direction.

As shown in FIG. 7, a roller or wheel 73 is rotatably mounted on a longitudinal axis carried by a bracket 74 secured to the outer end of the tool bar 58. Mounted on the inner end of tool bar 59 is an upright member 76 having a flat face in engagement with the roller 73. The roller 73 and member 76 coact to permit the tool bars 58 and 59 to move up and down independent of each other.

Mounted on the tool bars 58, 59, and 61, in alignment with the rows of crops 26, are earth working tools, indicated generally at 77. These tools are dual disc earth working units which function to cut and roll the soil away from opposite sides of the crops. The soil is turned toward the center of the space between the rows. The details of the earth working tool 77 are shown in FIGS. 6 to 9. The earth working tool 77 has a tool holder, indicated generally at 78, carrying a pair of forwardly converging discs 79 and 81. The holder 78 has an upright standard 82 and a horizontal trapezoidal-shaped plate 83 secured to the bottom of the standard. The standard 82 and plate 83 form a generally inverted T-shaped member. Secured to the outer sides of the plate 83 are horizontal arms 84 and 86. The arms 84 and 86 converge in a forward direction. The forward and rear portions of the arms 84 and 86 extend beyond the forward and rear edges of the plate 83. As shown in FIG. 9, the lower edges 87 and 88 of the arms 84 and 86, respectively, are beveled or tapered downwardly and outwardly. Mounted on the arms 84 and 86 are clamps, indicated generally at 89 and 91, for adjustably positioning the discs 79 and 81 along the length of the arms 84 and 86. The clamps are identical in structure. Each clamp has an upper downwardly open hook portion 92 positioned about the upper edge of the arm. Secured to the hook portion 92 is a downwardly extending leg having an upwardly directed toe forming a wedge-shaped pocket 94 for accommodating the beveled lower edge of the arm. The clamp is secured to the arm with a bolt 96 threaded through the hook portion and engageable with the top of the arm. When the bolt 96 is tightened, the lower beveled edge of the arm is wedged into the pocket 94 of the clamp. The disc is secured to the lower portion of the clamp with an outwardly directed bearing and axle assembly 97. The lower portion of the leg 93 may be formed with a twist about a vertical axis to determine the angular working pitch of the disc. Clamps with different types of pitch may be used to provide for a change in the working angle or pitch of the discs 79 and 81.

The tool holder is adjustably connected to the tool bar 58 with a two-piece clamping attachment 99 comprising a pair of C-shaped members secured together with a pair of bolts. One of the members has an upright rectangular opening 101 for accommodating the upright standard 82. A bolt 102 is used to clamp the standard to the attachment 99. The tool holder can be used to carry a set of weeder knives, in addition to the discs. Alternatively, the discs can be removed so that the tool holder can be used with weeder knives. A clamp, similar to the clamps 89 and 91, can be used to adjustably mount weeder knives on the arms 84 and 86.

Figure 6:
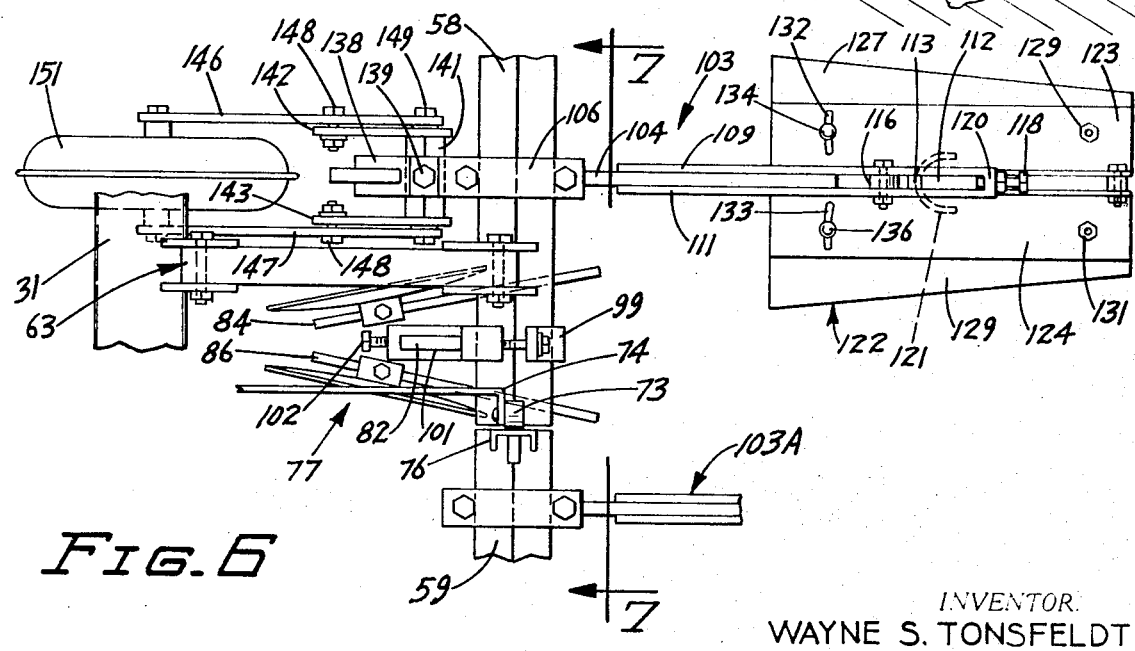
FIG. 6 is a top plan view of the guide and furrowing assembly mounted on the tool bar.

Referring to FIGS. 5 and 6, there is shown the guide and furrowing assembly, indicated generally at 103, for directing both the tractor and the cultivator in an aligned position down between the rows of crops 26. The guide and furrow assembly 103 has a longitudinal member or rail 104 adjustably mounted on an attachment 106 clamped to the tool bar 58. The attachment 106 is a two-piece member adjustably mounted on the tool bar 58 with a pair of nut and bolt assemblies. The bottom portion of the attachment 106 has a longitudinal opening 107, shown in FIG. 7, for accommodating the rail 104. A bolt 108, threaded into the attachment 106, engages the rail 104 to hold the rail 104 in assembled relation with the attachment.

Returning to FIGS. 5 and 6, a pair of longitudinal plates 109 and 111 are secured to opposite sides of the rear portion of the rail. The plates 109 and 111 project in a rearward direction and are located on opposite sides of an upright standard or bar 112. The standard 112 is a tool holder for making the guiding furrow 26 in the soil. The standard 112 is adjustably mounted on the plates 109 and 111 for adjustable movement in an upright direction, as well as forward and rearward directions, to change the angle of the standard. Located in engagement with the forward edge of the standard is an upright block 113 having a convex arcuate forward surface 114. The surface 114 extends in an upright direction and is engaged by a pair of vertically spaced cylindrical members 116 and 117 mounted on the plates 109 and 111 forwardly of the rear ends of the plates.

A pair of bolts 118 and 119 are threaded into an upright back portion 120 connecting the rear ends of the plates 109 and 111. These bolts engage the standard 112 and lock the standard with respect to the plates 109 and 111. Relative adjustment of the bolts 118 and 119 changes the angular position of the standard 112. The standard 112 moves along an arc established by the arcuate surface 114 of the block 113. In this manner, the standard 112 can be tilted in a rearward position, be positioned in a straight upright position, as shown in FIG. 5, or inclined in a forward position. This will change the digging action of the shovel 121 secured to the lower end of the standard 112.

As shown in FIGS. 2, 5, and 6, shovel 121 has an upright semicylindrical body. The midsection of the inside of the body is secured to the lower end of standard 112. The bottom end of the body is rounded to define a curved cutting edge. A layer 121A of hard metal is secured to the outside forward portion of the body to provide a wear resistant sharp cutting edge. In use, the soft metal of the body erodes away from the back of the hard metal. This leaves a sharp cutting edge on the shovel.

Mounted on the standard 112 over the shovel 121 is a generally inverted U-shaped shield, indicated generally at 122. Shield 122 has a pair of top members 123 and 124 secured with fasteners 126, as bolts, to the standard 112. Pivotally mounted on the top members 123 and 124 are a pair of side members 127 and 128. The side members 127 and 128 have rearwardly converging upright walls which function as plows to form a pair of parallel ridges in the soil on opposite sides of the furrow 27. The side members 127 and 128 are pivotally mounted on the top members 123 and 124, respectively, with a pair of pivot members 129 and 131, as nut and bolt assemblies. The pivot members 129 and 131 connect the rear portions of the side members 127 and 128 to the top members 123 and 124. The forward portions of the top members 123 and 124 have arcuate slots 132 and 133 for receiving fasteners 134 and 136 to attach the front portions of the side members 127 and 128 to the top members. The arcuate slots permit the side members 127 and 128 to pivot toward and away from each other and thereby change the width of the forward end of the shield 122, as well as the converging angle of the shield 122. As shown in FIG. 1, a shield, as well as a furrowing tool, is connected to the tool bars for use between each of the rows of the field.

Mounted on the front portion of the rail 104, forward of the attachment 106, is the guide unit, indicated generally at 137. A two-piece attachment 138 has a first piece adjustably positioned on the rail 104. This first piece has a bolt 139 to secure the attachment to the rail. The attachment holds a short transverse bar 141. Forwardly directed flat plates 142 and 143 are secured by welds to opposite ends of the bar. Each plate has an upwardly directed arcuate slot 144. Positioned adjacent the outside of the plates 142 and 143 are forwardly directed arms 146 and 147. Midportions of the arms 146 and 147 are attached with nut and bolt assemblies 148 to the plates 142 and 143. The bolts project through the arcuate slots 144 so that the arms can be adjusted relative to the plates. The rear ends of the arms 146 and 147 are attached with fasteners 149 to the opposite ends of the bar 141. Rotatably mounted on the forward ends of the arms 146 and 147 is a single wheel 151 adapted to follow a furrow between two rows of crops. The cultivator is provided with six guide units so that the cultivator follows six furrows made in the previous cultivation. The guide units cooperate together in pairs to guide each section of the cultivator so that the dual discs are automatically aligned with the crops, as shown in FIG. 1. The tractor's front wheels 22 also follow the furrows 27 so that the tractor is positioned in the field to initially align the dual discs with the rows of crops. This alignment is maintained by the furrows and the action of the guide units in the furrows. The wheels 151 of all the guide units carry a substantial part of the weight of the tool bars 58, 59, and 61 and the structure mounted on the tool bars when the cultivator is in the ground working position. The wheels 151, in addition to serving as guide means for the cultivator, serve as a depth control for the cultivator. The working depth of the cultivator can be adjusted by moving the arms 146 and 147 relative to the plates 142 and 143. The arcuate slots 144 permit vertical adjustment of the arms.

In use, the tractor 20 moves the cultivator 24 down the field. The dual discs function to cut and turn ribbons of soil adjacent opposite sides of each row. The soil is turned toward the center of the spaces between the rows. The shields 122 further collect the soil and prevent the soil being worked by the shovels 121 from covering the crops. Each shield 122 cooperates with the shovel 121 to form a furrow 27 which is used in the next cultivation to provide guide tracks for the tractor's wheels, as well as guide tracks for the wheels 151 of the cultivator guide units. The cultivator is raised to the up position by actuating the three-point hitch lift system. The main frame assembly 28 is raised to elevate the remainder of the cultivator out of engagement with the soil.

The cultivator frame assembly 28 is folded by moving the side beams 38 and 39 to their rearward longitudinal positions. This is accomplished by removing the pins 54 and swinging the inner ends of the side beams to an outward position. The outer ends of the side beams are moved between the holding plates 49 and 51. The beams are held in this position by replacing the pins 54. The arms 41 and 42 serve as supporting and pivot arms for the side beams 38 and 39.

While there have been shown and described preferred embodiments of the row crop cultivator having a folding frame assembly, a row guide mechanism, and an adjustable standard assembly, it is understood that various changes, substitutions and deletions may be made by those skilled in the art without departing from the spirit and scope of the invention.

The embodiments of the invention in which an exclusive property or privilege is claimed are defined as follows:

1. In an earth working implement having a frame means connectable to a tractor, tool bar means, linkage means connecting the tool bar means with the frame means, a plurality of spaced earth working tools mounted on the tool bar means for working the soil adjacent rows of crops, the improvement of: means mounted on the tool bar means for making a longitudinal furrow in the soil between adjacent rows of crops, said means mounted on the tool bar means comprising furrowing tool means, and shield means having a pair of rearwardly converging generally upright members located between adjacent rows of crops, one of said members located adjacent one side of said furrowing tool means and the other of said members located adjacent the other side of said furrowing tool means, said furrowing tool means and upright members of the shield means forming on movement of the implement a longitudinal furrow in the soil between adjacent rows of crops.

2. The implement of claim 1 wherein: said means mounted on the tool bar means includes a longitudinal member mounted on the tool bar means, said furrowing tool means having a generally upright standard mounted on the rear portion of the longitudinal member.

3. The implement of claim 2 wherein: said shield means is mounted on the standard to confine the worked soil to the space between the adjacent rows of crops.

4. The implement of claim 1 wherein: said shield means includes means to adjustably support the upright members whereby the converging relationship between the upright members can be changed.

5. The implement of claim 1 wherein: said shield means has top members and means to adjustably mount the upright members on the top members whereby the converging relationship between the upright members can be changed.

6. The implement of claim 4 wherein: the furrowing tool means includes a generally upright standard, said top members being mounted on said standard.

7. In an earth working implement having a frame means connectable to a tractor, tool bar means, linkage means connecting the tool bar means with the frame means, a plurality of spaced earth working tool means mounted on the tool bar means for working the soil adjacent rows of crops, the improvement of: row guide assembly means mounted on the tool bar means for controlling the transverse position of the tool bar means to maintain the positions of the earth working tools adjacent the rows of crops; said row guide assembly means comprising forward wheel means adapted to follow a longitudinal furrow located between adjacent rows of crops, a furrowing tool means longitudinally aligned behind the wheel means, and shield means having a pair of rearwardly converging members located between adjacent rows of crops; one of said members of the shield means located adjacent one side of said furrowing tool means and the other of said members located adjacent the other side of said furrowing tool means: said furrowing tool means and converging members of the shield means forming on movement of the implement a furrow in the soil longitudinally aligned with the wheel means.

8. The implement of claim 7 wherein: said row guide assembly includes a longitudinal member mounted on the tool bar means, means mounting the wheel means on the forward portion of the member, said furrowing tool means having a generally upright standard mounted on the rear portion of the longitudinal member.

9. The implement of claim 7 wherein: said shield means include means to adjustably support the upright members whereby the converging relationship between the upright members can be changed.

10. The implement of claim 7 wherein: said shield means has top members and means to adjustably mount the upright members on the top members whereby the converging relationship between the upright members can be changed.

11. The implement of claim 10 wherein: the furrowing tool means includes a generally upright standard, said top members being mounted on said standard.

12. An earth working implement mountable on a tractor comprising: main frame means connectable to a tractor, tool bar means, linkage means connecting the tool bar means with the main frame means, a plurality of spaced earth working tools mounted on the tool bar means for working the soil adjacent rows of crops, and row guide assembly means mounted on the tool bar means for controlling the transverse position of the tool bar means to locate the earth working tools adjacent the rows of crops, said row guide assembly means having a forward wheel means adapted to follow a longitudinal furrow located between adjacent rows of crops, a rear furrowing tool means longitudinally aligned with the wheel means, and shield means having a pair of rearwardly converging generally upright members located between adjacent rows of crops, one of said members located adjacent one side of said furrowing tool means and the other of said members located adjacent the other side of said furrowing tool means, said furrowing tool means and upright members of the shield means forming on movement of the implement a furrow in the soil longitudinally aligned with the wheel means.

13. The implement of claim 1 wherein: said row guide assembly means includes a longitudinal member mounted on the tool bar means, means mounting the wheel means on the forward portion of the member, said furrowing tool means having an upright standard mounted on the rear portion of the member, and a shovel mounted on the lower portion of the standard.

14. The implement of claim 13 wherein: said shield means is mounted on the standard to confine the worked soil to the space between adjacent rows of crops.

15. The implement of claim 13 including: adjustable means connecting the standard to the longitudinal member, said adjustable means comprising a block means having an upright convex face and an upright flat edge opposite the face, means on the longitudinal member engageable with the convex face, said standard engageable with the flat edge of the block means, sand holding means engageable with the standard to hold the standard in engagement with the block means and to hold the block means in engagement with the means on the longitudinal member.

16. The implement of claim 15 wherein: the means on the longitudinal member comprise vertically spaced cylindrical members and the holding means comprise vertically spaced bolts engaging vertically spaced portions of the standard.

17. The implement of claim 1 wherein: the main frame means has a section mountable on the tractor, a beam adjacent an end of the section, arm means pivotally mounting the beam to the section and holding means releasably connecting an end of the beam to the center section, second tool bar means, linkage means connecting the second tool bar means to said beam, a plurality of spaced earth working tools mounted on the second tool bar means for working the soil adjacent rows of crops, and row guide assembly means mounted on the second tool bar means for controlling the transverse position of the second tool bar means to locate the earth working tools adjacent the rows of crops, said row guide assembly means having a forward wheel means adapted to follow a longitudinal furrow located between adjacent rows of crops, a rear furrowing tool means longitudinally aligned with the wheel means, and shield means having a pair of rearwardly converging generally upright members located between adjacent rows of crops, one of said members located adjacent one side of said furrowing tool means and the other of said members located adjacent the other side of said furrowing tool means, said furrowing tool means and upright members of the shield means forming on movement of the implement a furrow in the soil longitudinally aligned with the wheel means.

18. The implement of claim 17 wherein: the arm means comprise an upper arm and a lower arm, first means pivotally connecting the upper arm and lower arm to a midportion of the beam, and second means pivotally mounting the upper arm and lower arm to the section.

19. The implement of claim 17 including: a second beam located adjacent the opposite end of the section, second arm means pivotally mounting the second beam to the section, and second holding means releasably connecting an end of the second beam to the section, third tool bar means, linkage means connecting the third tool bar means to said second beam, a plurality of spaced earth working tools mounted on the third tool bar means for working the soil adjacent rows of crops, and row guide assembly means mounted on the third tool bar means for controlling the transverse position of the third tool bar means to locate the earth working tools adjacent the rows of crops, said row guide assembly means having a forward wheel means adapted to follow a longitudinal furrow located between adjacent rows of crops, a rear furrowing tool means longitudinally aligned with the wheel means, and shield means having a pair or rearwardly converging generally upright members located between adjacent rows of crops, one of said members located adjacent one side of said furrowing tool means and the other of said members located adjacent the other side of said furrowing tool means, said furrowing tool means and upright members of the shield means forming on movement of the implement a furrow in the soil longitudinally aligned with the wheel means.

20. The implement of claim 17 including: pivot means connecting the arm means to a midportion of the beam, whereby the outer end of the beam can be moved adjacent the end of the section and connected thereto with the holding means.

21. The implement of claim 1 wherein: said shield means include means to adjustably support the upright members whereby the converging relationship between the upright members can be changed.

22. The implement of claim 1 wherein: said shield means has top members and means to adjustably mount the upright members on the top members whereby the converging relationship between the upright members can be changed.

23. The implement of claim 22 wherein: the furrowing tool means includes a generally upright standard, said top members being mounted on said standard.

* * * * *